(12) United States Patent
Lee et al.

(10) Patent No.: US 10,536,260 B2
(45) Date of Patent: Jan. 14, 2020

(54) BASEBAND INTEGRATED CIRCUIT FOR PERFORMING DIGITAL COMMUNICATION WITH RADIO FREQUENCY INTEGRATED CIRCUIT AND DEVICE INCLUDING THE SAME

(71) Applicant: SAMSUNG ELECTRONICS CO., LTD., Suwon-si, Gyeonggi-do (KR)

(72) Inventors: Jae Chol Lee, Suwon-si (KR); Bong Kyu Kim, Seoul (KR); June-Hee Lee, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/468,564

(22) Filed: Mar. 24, 2017

(65) Prior Publication Data
US 2018/0019865 A1    Jan. 18, 2018

(30) Foreign Application Priority Data
Jul. 15, 2016 (KR) ........................ 10-2016-0090198

(51) Int. Cl.
*H04L 7/08* (2006.01)
*H04L 7/00* (2006.01)
*H04L 25/40* (2006.01)
*H04W 52/02* (2009.01)

(52) U.S. Cl.
CPC .............. *H04L 7/08* (2013.01); *H04L 7/0087* (2013.01); *H04L 25/40* (2013.01); *H04W 52/0229* (2013.01)

(58) Field of Classification Search
CPC ..... H04L 7/0087; H04L 7/08; H04L 27/2655; H04J 3/0685; H03D 3/004
See application file for complete search history.

(56) References Cited

U.S. PATENT DOCUMENTS 7,583,627 B2    9/2009  Hirsch
7,984,321 B2    7/2011  Shibata et al.
(Continued)

FOREIGN PATENT DOCUMENTS

| CN | 102136843 A | 7/2011 |
| CN | 103650356 A | 3/2014 |
| KR | 2003-0035316 A | 5/2003 |

OTHER PUBLICATIONS

Chinese Office action dated Sep. 4, 2019 for corresponding CN 201710554740.3.

*Primary Examiner* — Aristocratis Fotakis
(74) *Attorney, Agent, or Firm* — Lee & Morse, P.C.

(57) ABSTRACT

A baseband IC for performing digital communication with an RFIC and a device including the same. The baseband IC for performing digital communication with an RFIC includes a digital interface circuit configured to receive a frame signal including at least one sampled signal from the RFIC according to a digital interface protocol, reconstruct the at least one sampled signal from the frame signal, and transfer the reconstructed sampled signal to a baseband modem in synchronization with a reception reference signal, and a sample synchronization manager configured to generate the reception reference signal, wherein the frame signal is transmitted from the RFIC to the baseband IC in synchronization with a transmission reference signal.

15 Claims, 13 Drawing Sheets

(56) References Cited

U.S. PATENT DOCUMENTS

| | | | |
|---|---|---|---|
| 8,331,885 B1* | 12/2012 | Ben-Ari | H04B 1/04 |
| | | | 455/127.5 |
| 8,537,945 B1 | 9/2013 | Ben-Ari et al. | |
| 8,630,600 B1* | 1/2014 | Vann | H03C 3/406 |
| | | | 455/226.3 |
| 8,737,551 B1 | 5/2014 | Agami et al. | |
| 8,903,348 B2 | 12/2014 | Gronemeyer et al. | |
| 9,059,795 B2 | 6/2015 | Sittler et al. | |
| 2004/0204096 A1 | 10/2004 | Hirsch et al. | |
| 2009/0164821 A1 | 6/2009 | Drescher | |
| 2011/0053536 A1* | 3/2011 | Friedmann | H03D 7/161 |
| | | | 455/207 |
| 2011/0158298 A1 | 6/2011 | Djadi et al. | |
| 2012/0203943 A1 | 8/2012 | Mutou | |
| 2012/0220246 A1* | 8/2012 | Kushnir | H04B 1/04 |
| | | | 455/118 |
| 2012/0314737 A1* | 12/2012 | Vann | H04B 1/40 |
| | | | 375/219 |
| 2013/0077642 A1* | 3/2013 | Webb, III | H03L 7/1974 |
| | | | 370/503 |
| 2013/0136163 A1* | 5/2013 | Friedmann | H04W 88/085 |
| | | | 375/220 |
| 2014/0286357 A1* | 9/2014 | Shenoi | H04J 3/0688 |
| | | | 370/503 |
| 2015/0110214 A1* | 4/2015 | Luo | H04W 88/085 |
| | | | 375/267 |
| 2016/0254874 A1* | 9/2016 | Kennard | H04B 7/0613 |
| | | | 375/257 |
| 2017/0220517 A1* | 8/2017 | Khan | G06F 1/3287 |

* cited by examiner

BASEBAND INTEGRATED CIRCUIT FOR PERFORMING DIGITAL COMMUNICATION WITH RADIO FREQUENCY INTEGRATED CIRCUIT AND DEVICE INCLUDING THE SAME

CROSS-REFERENCE TO RELATED APPLICATION

Korean Patent Application No. 10-2016-0090198, filed on Jul. 15, 2016, and entitled, "Baseband Integrated Circuit for Performing Digital Communication with Radio Frequency Integrated Circuit and Device Including the Same," is incorporated by reference herein in its entirety.

BACKGROUND

1. Field

One or more embodiments described herein relate to a baseband integrated circuit for performing digital communication with a radio frequency integrated circuit, and a device including such a circuit.

2. Description of the Related Art

A wireless communication device may use an analog interface between a radio frequency integrated circuit (RFIC) and a baseband modem. This type of interface may increase chip manufacturing costs because of the excessive number of pins used to satisfy bandwidth requirements.

In an attempt to overcome these drawbacks, a digital interface has been proposed. However, a digital interface may allow the latency between transmission and reception sides of the system to vacillate based on variable timing factors. Also, performance of the wireless communication device may deteriorate as a result of performing RF band-to-baseband (BB) synchronization.

SUMMARY

In accordance with one or more embodiments, a baseband integrated circuit (IC) for performing digital communication with a radio frequency integrated circuit (RFIC), including a digital interface to receive a frame signal including at least one sampled signal from the RFIC based on a digital interface protocol, reconstruct the at least one sampled signal from the frame signal, and transfer the reconstructed sampled signal to a baseband modem in synchronization with a reception reference signal; and a sample synchronization manager to generate the reception reference signal, wherein the baseband IC is to receive the frame signal from the RFIC in synchronization with a transmission reference signal.

In accordance with one or more other embodiments, a wireless communication device includes a radio frequency integrated circuit (RFIC); and a baseband IC to perform digital communication with the RFIC, wherein the baseband IC includes: a digital interface to receive a frame signal including at least one sampled signal from the RFIC according to a digital interface protocol, reconstruct the at least one sampled signal from the frame signal, and transfer the reconstructed sampled signal to a baseband modem in synchronization with a reception reference signal; and a sample synchronization manager to generate the reception reference signal, wherein the frame signal is to be transmitted from the RFIC to the baseband IC in synchronization with a transmission reference signal.

In accordance with one or more other embodiments, a method for performing digital communication between an RFIC and a baseband IC, the method including generating at least one sampled signal by converting an analog signal to a digital signal based on a sampling clock; converting the at least one sampled signal to a frame signal in synchronization with a transmission reference signal; transmitting the frame signal to the baseband IC according to a digital interface protocol; receiving, by the baseband IC, the frame signal and reconstructing the at least one sampled signal from the frame signal; and transferring the reconstructed sampled signal to a baseband modem in synchronization with a reception reference signal.

In accordance with one or more other embodiments, a baseband integrated circuit (IC) for performing digital communication with a radio frequency integrated circuit (RFIC), including first logic to reconstruct at least one sampled signal from a frame signal and to output the reconstructed at least one sampled signal to a baseband modem in synchronization with a reception reference signal; and second logic to generate the reception reference signal, wherein the first logic is to receive the frame signal from the RFIC in synchronization with a transmission reference signal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
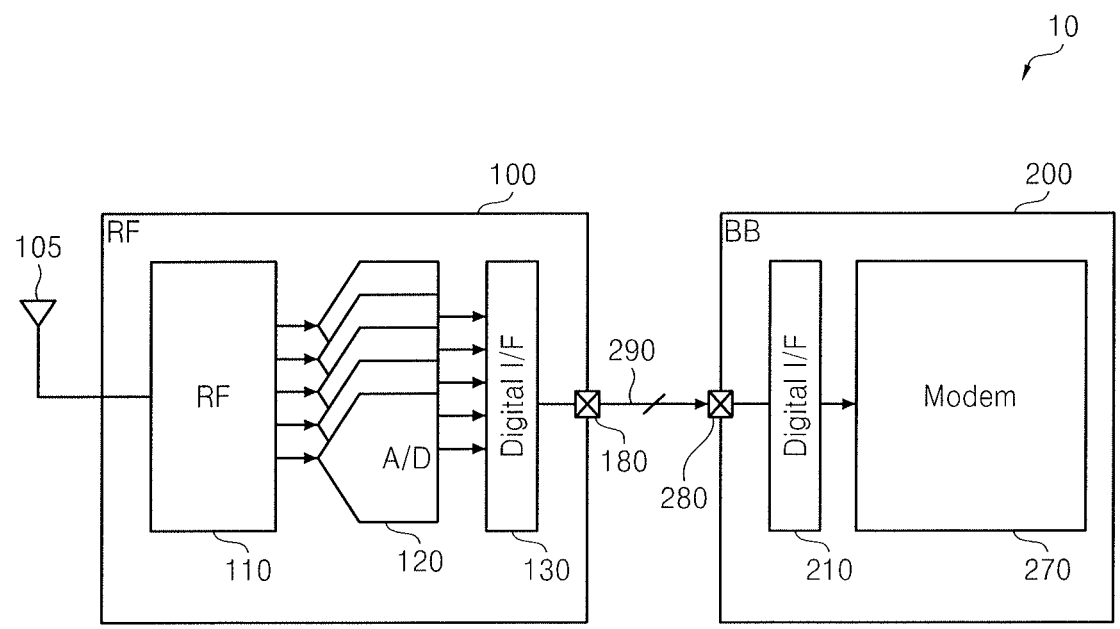
FIG. 1 illustrates an embodiment of a wireless communication device.
Figure 2A:
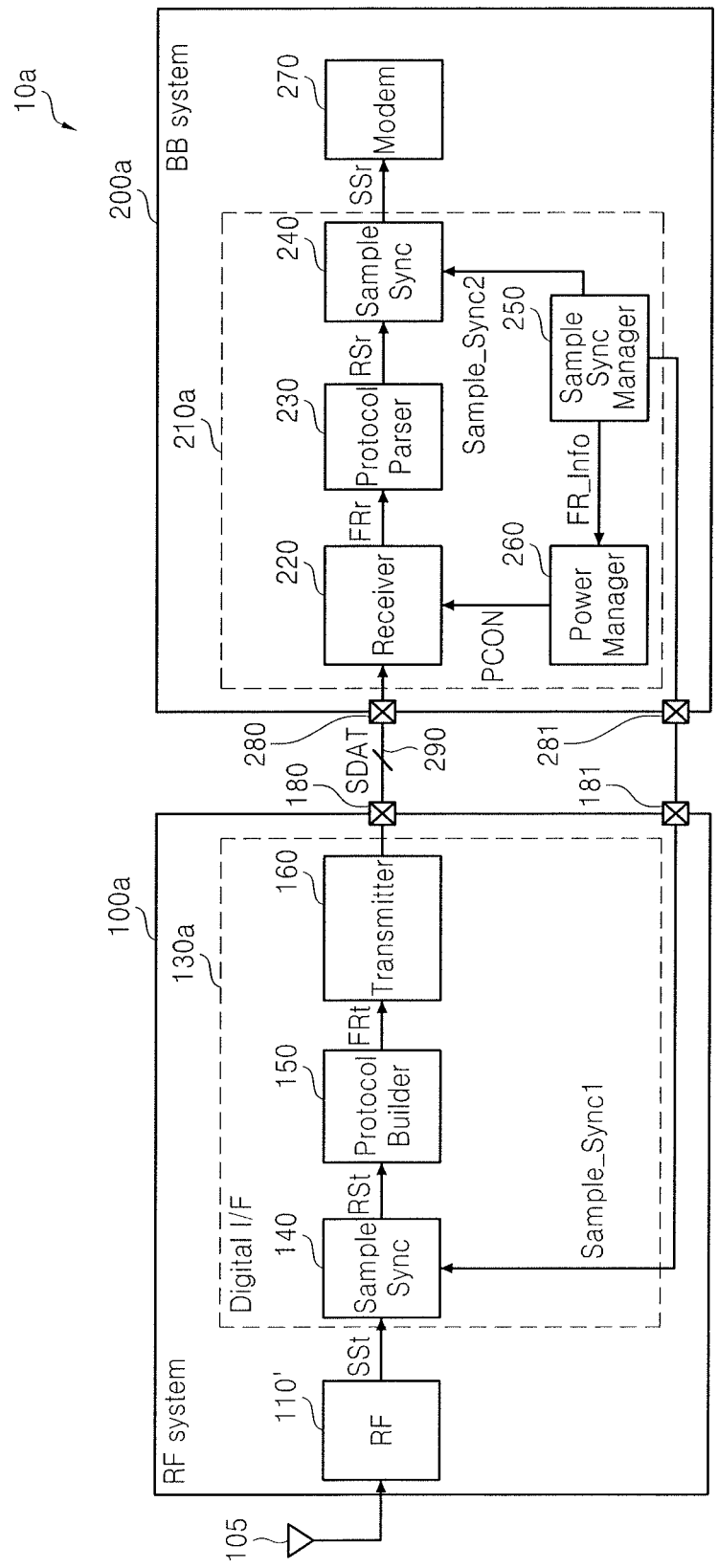
FIG. 2A illustrates another embodiment of a wireless communication device.

FIG. 1 illustrates a wireless communication device 10, and FIG. 2A illustrates an embodiment of a wireless communication device 10a which, for example, may correspond to the device in FIG. 1. Referring to FIGS. 1 and 2A, a wireless communication device 10 or 10a includes an RF sub-system 100 or 100a and a baseband (BB) sub-system 200 or 200a. The RF sub-system 100 or 100a receives an RF signal through one or more antennas 105 and processes the received RF signal. The RF sub-system 100 or 100a converts the RF signal to a digital signal and transmits the digital signal to the BB sub-system 200 or 200a using a digital interface. The BB sub-system 200 or 200a receives the digital signal from the RF sub-system 100 or 100a and processes the digital signal.

The RF sub-system 100 or 100a and the BB sub-system 200 or 200a communicate with each other through the digital interface. The RF sub-system 100 or 100a and the BB sub-system 200 or 200a may be implemented as separate individual IC chips and may communicate with one another through one or more data lanes 290 and a plurality of pins 180 or 280.

The RF sub-system 100 includes an RF signal processing circuit 110, an Analog-to-Digital (A/D) converter 120, and a digital interface circuit 130.

The BB sub-system 200 includes a digital interface circuit 210 and a modem 270. For the convenience of description, the data interface circuit 130 of the RF sub-system 100 may be referred to as a transmission-side digital interface circuit 130, and the digital interface circuit 210 of the BB sub-system 200 may be referred to as a reception-side digital interface circuit 210.

The RF signal processing circuit 110 processes an RF signal received through the one or more antennas 105. The RF signal processing circuit 110 may include an amplifier for amplifying the RF signal (e.g. a low noise amplifier (LNA)), a down converter for converting the RF signal to a baseband signal, and a filter for filtering an analog signal. The filter may be a band-pass filter or another type of filter.

The A/D converter 120 converts an analog signal to a digital signal. In so doing, the A/D converter 120 may sample the analog signal based on a sampling clock, quantize the sampled signal, and output a sampled signal SSt corresponding to the digital signal.

The wireless communication device 10 having a plurality of antennas may include a plurality of A/D converters 120 for respectively converting RF signals received from a plurality of antennas 105 into digital signals. According to some embodiments, the A/D converters 120 may be included in an RF signal processing circuit (110' in FIG. 2A).

The transmission-side digital interface circuit 130 generates a frame signal FRt including at least one sampled signal according to a digital interface protocol and transmits the frame signal FRt to the reception-side digital interface circuit 210. The transmission-side digital interface circuit 130 generates the frame signal FRt by synchronizing the sampled signal SSt, received from the A/D converter 120, with a transmission reference signal Sample_Sync1.

Referring to FIG. 2A, a transmission-side digital interface circuit 130a includes a sample synchronization (sync) circuit 140, a protocol builder 150, and a transmitter 160. The sample synchronization circuit 140 may temporarily store the sampled signal SSt, output from the A/D converter 120 of the RF signal processing circuit 110', and may output one or more sampled signals RSt in synchronization with the transmission reference signal Sample_Sync1.

The protocol builder 150 receives the one or more sampled signals RSt, synchronized with the transmission reference signal Sample_Sync1, and converts the received sampled signals to the frame signal FRt according to a predefined digital interface protocol. The sampled signals RSt, which are synchronized with the transmission reference signal Sample_Sync1, are different from the sampled signal SSt only with respect to timing and may otherwise may be identical.

According to some embodiments, the frame signal FRt may include a frame header and payload data. The frame header may include information corresponding to the size (length) of the payload data. The payload data may be data generated based on a plurality of sampled signals RSt. The frame signal FRt may further include Cyclic Redundancy Check (CRC) data to obtain reliability of data.

The transmitter 160 may convert the frame signal FRt to a serial signal SDAT for transmission to the BB system 200a through one or more data lanes 290.

A reception-side digital interface circuit 210a receives the frame signal, which is synchronized with the transmission reference signal Sample_Sync1, from the transmission-side digital interface circuit 130a, reconstructs at least one sampled signal from the frame signal, and transfers the reconstructed sampled signal to the baseband modem 270 in synchronization with a reception reference signal.

Referring to FIG. 2A, the reception-side digital interface circuit 210a includes a receiver 220, a protocol parser 230, a sample synchronization circuit 240, a sample synchronization manager 250, and a power manager 260. The receiver 220 receives the serial signal SDAT from the transmission-side digital interface circuit 130a through the data lanes 290, and reconstructs a frame signal FRr by converting the serial signal SDAT to a parallel signal. The reconstructed frame signal FRr may be physically different from the frame signal FRt, generated by the transmission-side digital interface circuit 130a, for example, due to the transmission environment, but otherwise may be identical to the frame signal FRt from the standpoint of content.

The protocol parser 230 reconstructs one or more sampled signals RSr from the frame signal FRr.

The sample synchronization circuit 240 transfers the reconstructed sampled signals RSr to the baseband modem 270 in synchronization with a reception reference signal Sample_Sync2. The reconstructed sampled signals RSr may have variable timing, for example, due to a variable timing factor on a transmission path between the transmission-side digital interface circuit 130 and the reception-side digital interface circuit 210. The sample synchronization circuit 240 synchronizes the sampled signals RSr, having variable timing with the reception reference signal Sample_Sync2, and transfers the synchronized sampled signals to the baseband modem 270.

The modem 270 receives and processes sampled signals SSr synchronized with the reception reference signal Sample_Sync2.

The sample synchronization manager 250 generates the transmission reference signal Sample_Sync1 and reception reference signal Sample_Sync2. The transmission reference signal Sample_Sync1 and the reception reference signal Sample_Sync2 have the same frequency, but different phases. For example, the reception reference signal Sample_Sync2 may have a constant phase difference (e.g., an offset) with respect to the transmission reference signal Sample_Sync1. The sample synchronization manager 250 may be implemented in hardware, software or a combination thereof.

In the embodiment of FIG. 2A, the sample synchronization manager 250 generates the transmission reference signal Sample_Sync1 and transmits it to the RF sub-system 100a. For example, the sample synchronization manager 250 may transmit the transmission reference signal Sample- _Sync1 to the RF sub-system 100a through separate reference signal pins 181 and 281.

When the RF sub-system 100a and the BB sub-system 200a are implemented as separate chips, each chip may include a plurality of pins 180 and 181 or 280 and 281. The pins 180, 181, 280, and 281 may include data pins 180 and 280 to transmit and receive a serial signal, power pins to carry power, and one or more reserved pins. One or more of the reserved pins may be used to transmit the transmission reference signal Sample_Sync1.

In accordance with some embodiments, the sample synchronization manager 250 may be implemented in the RF sub-system 100a. The sample synchronization manager 250 may generate and transmit the reception reference signal Sample_Sync2 to the BB sub-system 200a through the reference signal pins 181 and 281.

In accordance with some embodiments, the sample synchronization manager 250 may be implemented in each of the RF sub-system 100a and the BB sub-system 200a. The RF sub-system 100a may generate the transmission reference signal Sample_Sync1. The BB sub-system 200a may generate the reception reference signal Sample_Sync2. Even in this case, the phase difference between the transmission reference signal Sample_Sync1 and the reception reference signal Sample_Sync2 may be fixed at a specific offset value.

The power manager 260 controls the operating mode of the receiver 220 based on frame synchronization information FR_Info from the sample synchronization manager 250. The frame synchronization information FR_Info may be either information indicating the time at which each frame signal is received or information that enables the time at which each frame signal is to be received to be predicted, and may be information based on the reception reference signal Sample_Sync2.

The power manager 260 may predict the time at which a transmitted frame signal is to be received based on the frame synchronization information FR_Info. For example, the power manager 260 may predict an interval during which a frame signal is to be received and an interval during which a frame signal is not to be received because the frame signal is received in synchronization with the transmission reference signal Sample_Sync1.

Accordingly, the power manager 260 may control the operating mode based on the frame synchronization information FR_Info to cause the receiver 220 to enter a power-down mode. This may be accomplished, for example, by disabling the receiver 220 during an idle interval from a time of completion of reception of a single frame signal to the time before a subsequent frame signal is received (or before the predicted time of reception). The power manager 260 may cause the receiver 220 to enter an active mode by waking up the receiver 220 at the time at which a subsequent frame signal is to be received (or the predicted time of reception).

Figure 2B:
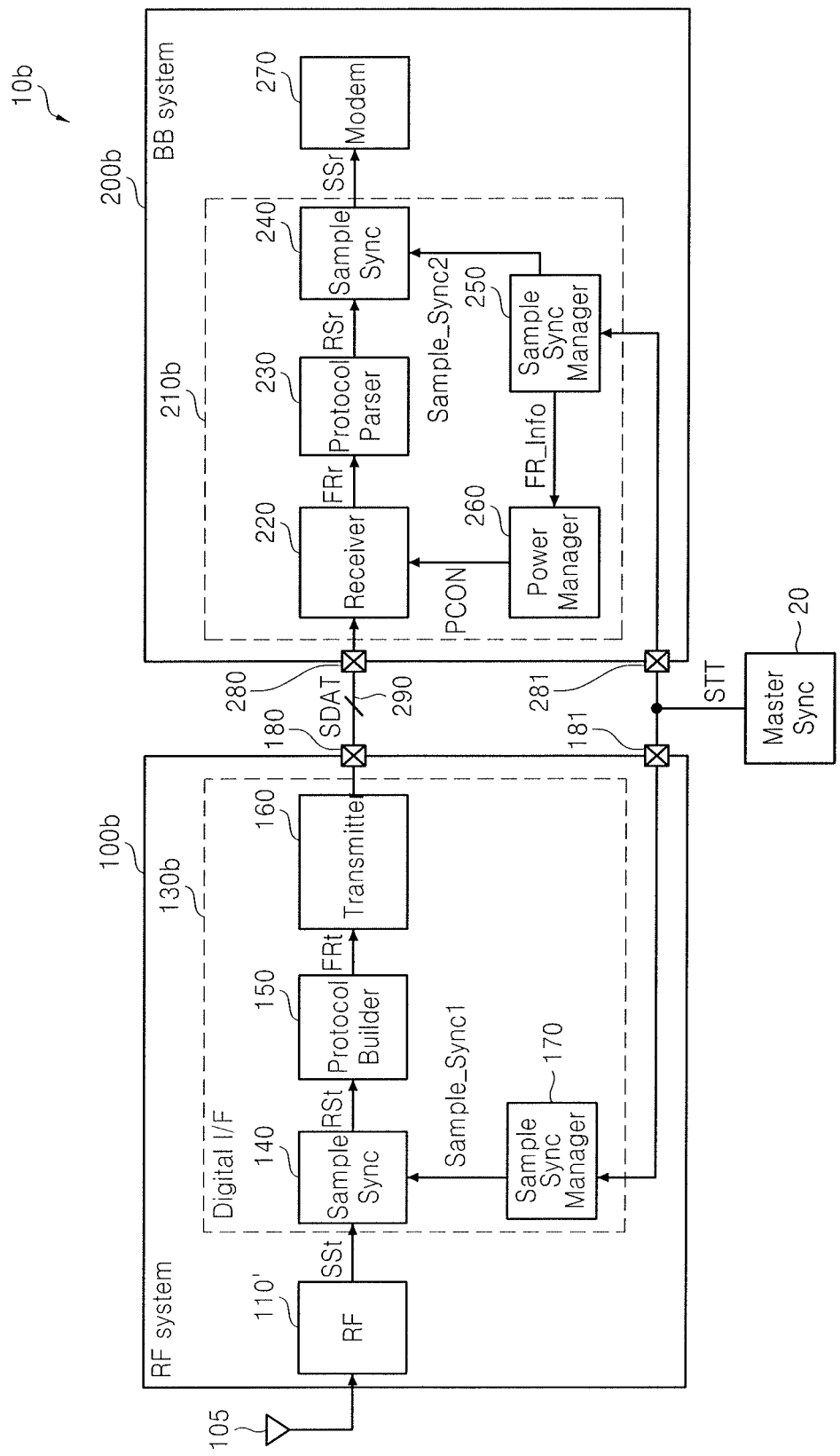
FIG. 2B illustrates another embodiment of a wireless communication device.

FIG. 2B illustrates another embodiment of a wireless communication device 10b which has a structure and operation similar to the wireless communication device 10a in FIG. 2A except as follows.

Referring to FIG. 2B, the wireless communication device 10b includes a master synchronization (sync) circuit 20 generating a start signal STT at predetermined periods (e.g. at intervals of 10 ms). The start signal STT may be provided to the RF sub-system 100b and to the BB sub-system 200b.

The RF sub-system 100b includes a sample synchronization manager 170, unlike the RF sub-system 100a of FIG. 2A. The RF sub-system 100b may wake up based on the start signal STT and may then receive and process an RF signal.

The sample synchronization manager 170 of the RF sub-system 100b may generate a transmission reference signal Sample_Sync1 based on the start signal STT. Similarly, the sample synchronization manager 250 of the BB sub-system 200b may generate a reception reference signal Sample_Sync2 based on the start signal STT.

Even in this case, the phase difference between the transmission reference signal Sample_Sync1 and the reception reference signal Sample_Sync2 may be fixed at a specific offset value. According to some embodiments, the master synchronization circuit 20 may be implemented in the BB sub-system 200b.

Thus, according to some embodiments, the sample synchronization circuits 140 and 240 are respectively provided in the input stage of the transmission-side digital interface circuit 130 of the RF sub-system 100 and the output stage of the reception-side digital interface circuit 210 of the BB sub-system 200, to eliminate variable timing factors that occur during transmission between the transmission-side sample synchronization circuit 140 and the reception-side sample synchronization circuit 240.

According to some embodiments, even if the transmission timing varies due to components in a transmission path between the transmission-side sample synchronization circuit 140 and the reception-side sample synchronization circuit 240, the phase difference between the transmission reference signal Sample_Sync1 and the reception reference signal Sample_Sync2 is fixed. Thus, latency between the time of signal output from the transmission-side sample synchronization circuit 140 and the time of signal output from the reception-side sample synchronization circuit 240 may be fixed.

Figure 3:
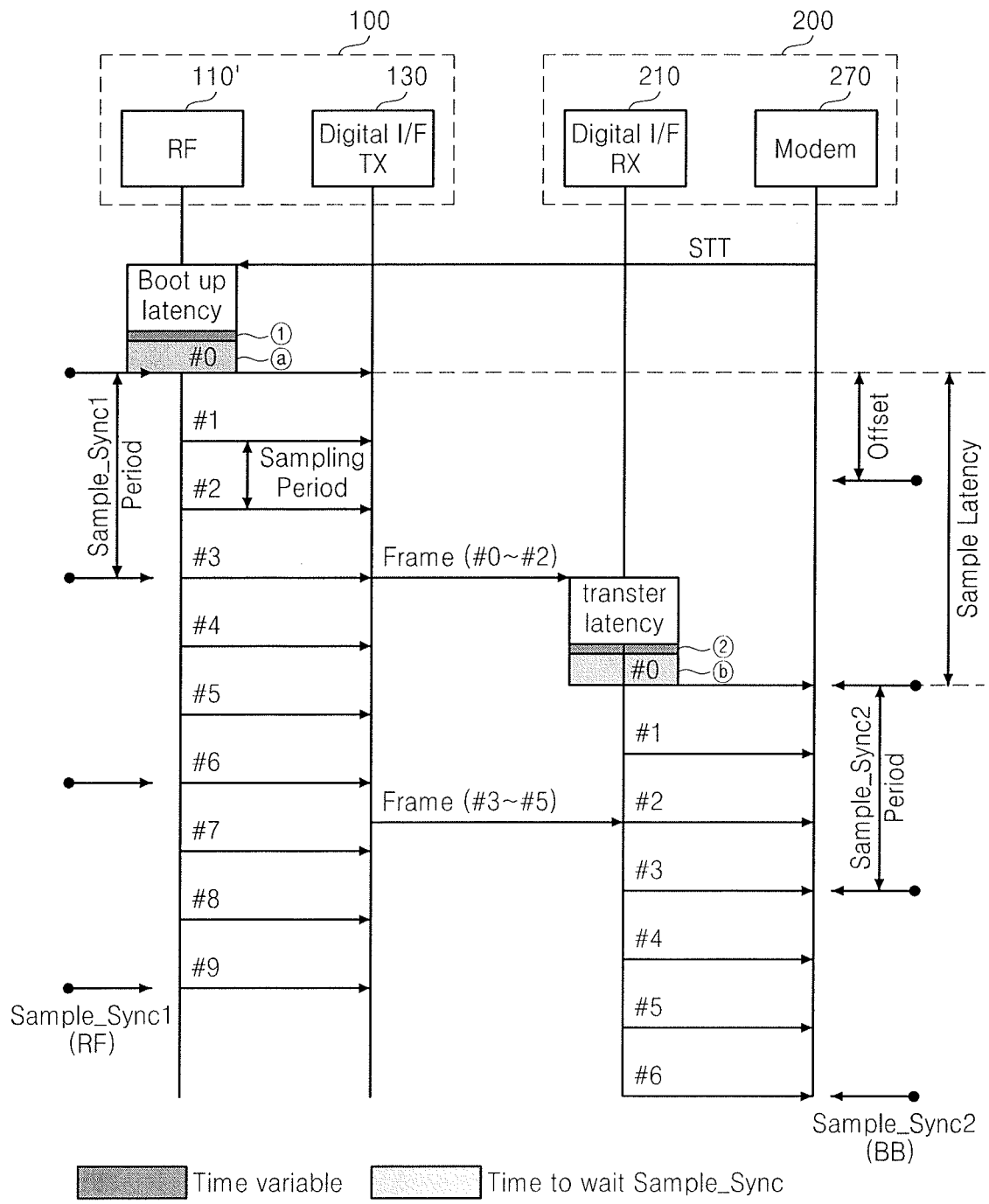
FIG. 3 illustrates operation of an RF sub-system and a BB sub-system according to one embodiment.

FIG. 3 illustrates an embodiment for explaining operation of the RF sub-system and the BB sub-system. The RF sub-system in FIG. 3 may be the RF sub-system100a or 100b in FIG. 2A or 2B, and the BB sub-system may be the BB sub-system 200a or 200b in FIG. 2A or 2B. In the embodiment of FIG. 3, modem 270 may generate and transmit the start signal STT to the RF sub-system 100.

Referring to FIGS. 2A, 2B, and 3, the modem 270 of the BB sub-system 200 transmits the start signal STT to the RF sub-system 100 at predetermined periods. The RF signal processing circuit 110' wakes up based on the start signal STT, performs a boot-up sequence, and receives and processes an RF signal. For example, the RF signal processing circuit 110' may perform processing such as amplifying, down-converting, and filtering the RF signal and may then generate sampled signals #0 to #9 by converting a resultant signal into a digital signal.

The sampled signals #0 to #9 may be generated at intervals of a predefined sampling period. For example, the RF signal processing circuit 110' may generate the sampled signals #0 to #9 by sampling the analog signal at the sampling period.

Here, boot-up latency attributable to the boot-up sequence and latency attributable to signal processing in the RF signal processing circuit 110' may occur.

The RF signal processing circuit 110' transfers the sampled signals to the transmission-side digital interface circuit 130. The transmission-side digital interface circuit 130 may receive the sampled signals #0 to #9 from the RF signal processing circuit 110' and may temporarily store the sampled signals in a buffer.

According to some embodiments, the transmission-side digital interface circuit 130 may further include a buffer for temporarily storing the sampled signals. The buffer may be, for example, a first-in first-out (FIFO) buffer. The sampled signals #0 to #9 may be temporarily stored in the buffer, and the stored sampled signals #0 to #9 may be output based on the transmission reference signal Sample_Sync1.

The transmission-side digital interface circuit 130 may convert one or more sampled signals stored in the buffer to a frame signal in synchronization with the transmission reference signal Sample_Sync1. The period of the transmission reference signal Sample_Sync1 may be greater than the sampling period. For example, the period of the transmission reference signal Sample_Sync1 may be, for example, about N times the sampling period (where N is an integer equal to or greater than 2). In the embodiment of FIG. 3, the period of the transmission reference signal Sample_Sync1 is about 3 times the sampling period.

In this case, the transmission-side digital interface circuit 130 may generate a single frame signal (e.g. frame (#0~#2)) from three sampled signals #0 to #2. The transmission-side digital interface circuit 130 may generate a frame signal including three sampled signals, convert the frame signal to a serial signal, and transmit the serial signal to the reception-side digital interface circuit 210 of the BB sub-system 200.

As described above, whenever each sampled signal is generated, the RF sub-system 100 may synchronously transmit the sampled signal to the BB sub-system 200 in synchronization with the transmission reference signal Sample_Sync1, rather than asynchronously transmitting the sampled signal to BB sub-system 200. Accordingly, a time variable, which may occur during the boot-up sequence of the RF sub-system 100, may be eliminated through this synchronization using the transmission reference signal Sample_Sync1.

The reception-side digital interface circuit 210 of the BB sub-system 200 may receive the serial signal and perform the reverse of the procedure performed by the transmission-side digital interface circuit 130 of the RF sub-system 100. For example, the reception-side digital interface circuit 210 may convert the serial signal to a parallel signal, parse the frame signal, and then reconstruct the sampled signals #0 to #9.

The reception-side digital interface circuit 210 transfers the reconstructed sampled signals #0 to #9 to the modem 270 in synchronization with the reception reference signal Sample_Sync2. For example, whenever each of the reconstructed sampled signals #0 to #9 is generated, the reception-side digital interface circuit 210 waits for the reception reference signal Sample_Sync2 and transfers the reconstructed sampled signal to the modem 270 in synchronization with the reception reference signal Sample_Sync2, rather than immediately transferring the reconstructed sampled signals #0 to #9 to the modem 270.

Accordingly, the time variable, which occurs during transmission of signals between the transmission-side digital interface circuit 130 of the RF sub-system 100 and the reception-side digital interface circuit 210 of the BB sub-system 200, may be reduced or eliminated via synchronization based on the reception reference signal Sample_Sync2. Therefore, the transmitter 100 may perform synchronization using the transmission reference signal Sample_Sync1 and the receiver 200 may perform synchronization using the reception reference signal Sample_Sync2, thus enabling sample latency to have a fixed (constant) value.

The sample latency may be a sum of the period of the reception reference signal Sample_Sync2 (Sample_Sync2 Period) and an offset. The offset may be a phase difference between the transmission reference signal Sample_Sync1 and the reception reference signal Sample_Sync2. The period of the reception reference signal Sample_Sync2 (Sample_Sync2 Period) may, for example, be identical to the period of the transmission reference signal Sample_Sync1 (Sample_Sync1 Period). Accordingly, sample latency may also have a constant value since the offset and period of the reception reference signal (Sample_Sync2 Period) have respective constant values.

Figure 4:
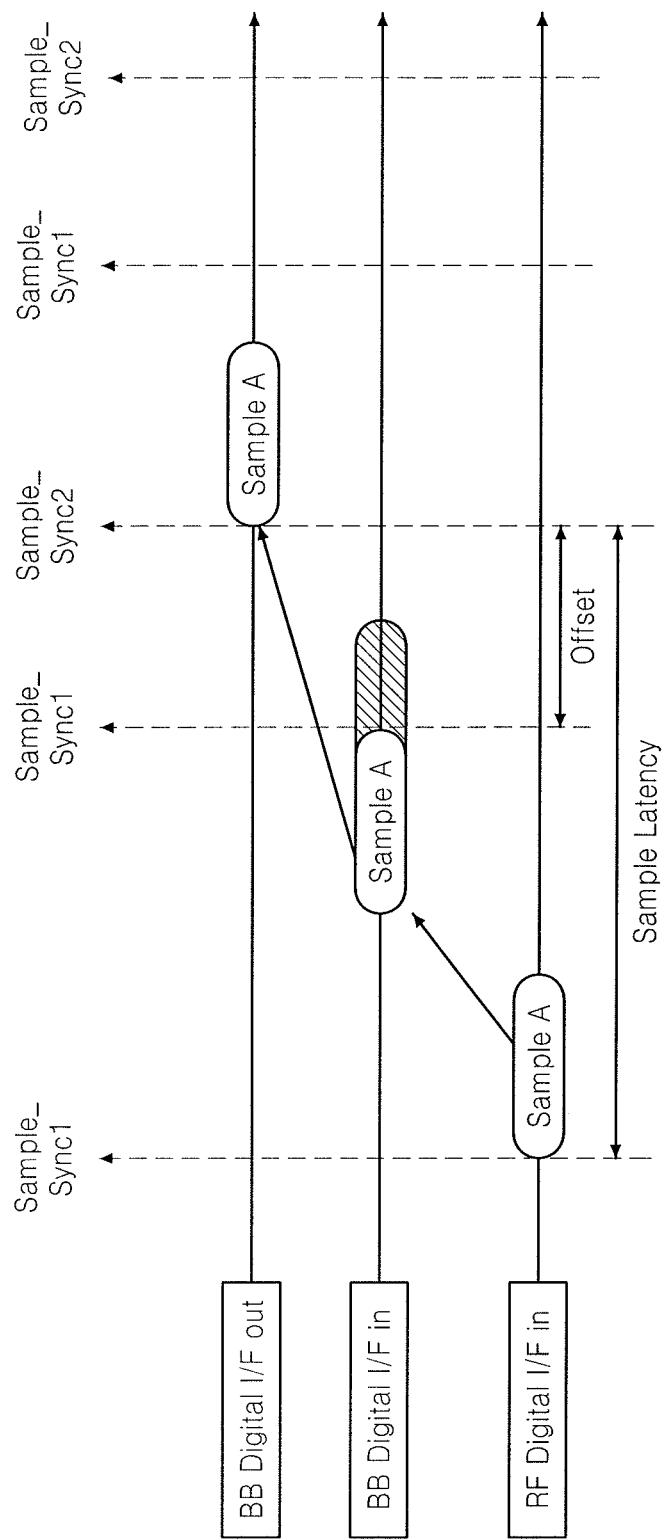
FIG. 4 illustrates a relationship between a transmission reference signal Sample_Sync1 and a reception reference signal Sample_Sync2 according to one embodiment.

FIG. 4 illustrates a relationship between the transmission reference signal Sample_Sync1 and the reception reference signal Sample_Sync2 according to one embodiment. Referring to FIGS. 3 and 4, the transmission-side digital interface circuit (RF digital I/F) 130 generates "Sample A" in synchronization with the transmission reference signal Sample_Sync1. In one embodiment, "Sample A" may be a signal including at least one sampled signal and, for example, may be a frame signal (e.g. Frame (#0~#2) in FIG. 3).

The time at which "Sample A" is received by the reception-side digital interface circuit (BB digital I/F) 210 may be variable due to logic latency on a transmission path, occurring while "Sample A" is transmitted to the reception-side digital interface circuit (BB digital I/F) 210. Accordingly, the offset between the transmission reference signal Sample_Sync1 and the reception reference signal Sample_Sync2 may be determined taking a variable range attributable to the logic latency on the transmission path into consideration. For example, an offset in which the maximum logic latency on the transmission path is considered may be set to be a constant value. Accordingly, constant sample latency may be secured.

Figure 5:
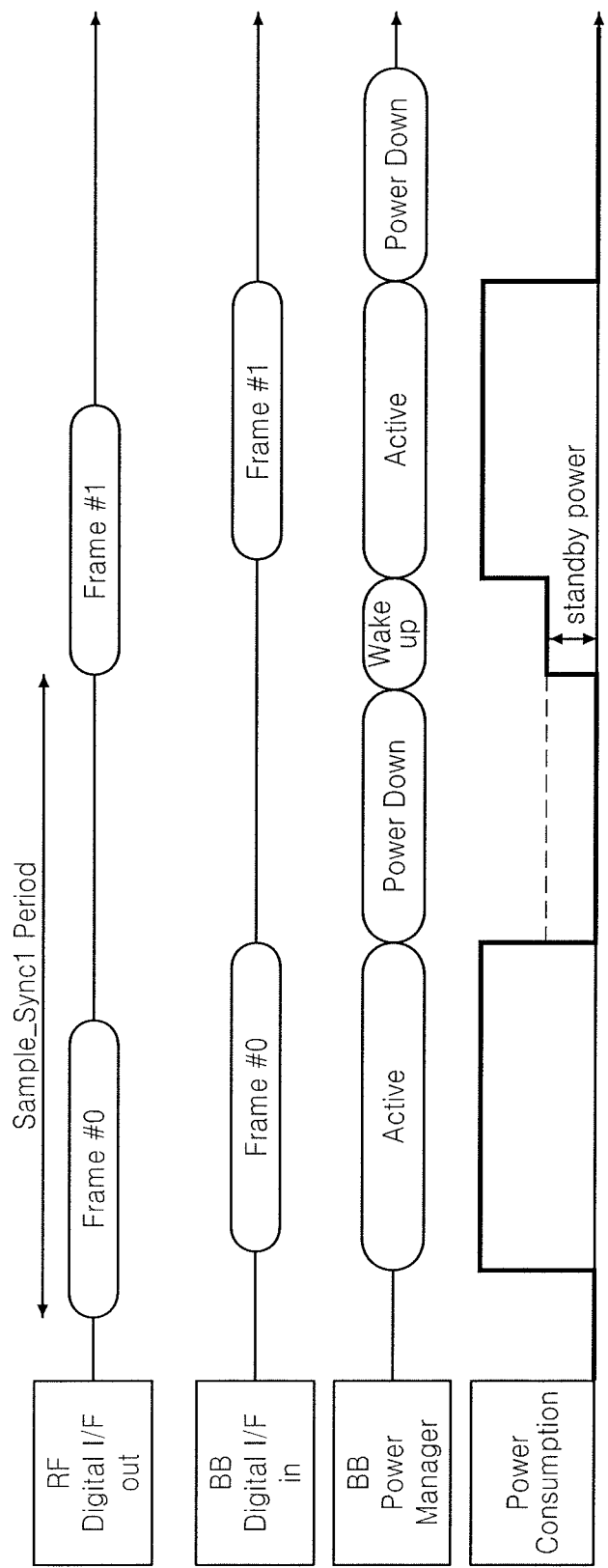
FIG. 5 illustrates an embodiment of a power management method.

FIG. 5 illustrates an embodiment of a power management method, which, for example, may be performed by the power manager 260 in FIG. 2A. Referring to FIGS. 2A and 5, the transmission-side digital interface circuit 130a of the RF sub-system 100a generates and transmits frame signals Frame #0 and Frame #1 in synchronization with the transmission reference signal Sample_Sync1. The frame signal Frame #0 may correspond to the frame signal of FIG. 3 (Frame (#0~#2)), and the frame signal Frame #1 may correspond to the frame signal of FIG. 3 (Frame (#3~#5)).

Therefore, a single frame signal Frame #0 or Frame #1 is generated and transmitted every period of the transmission reference signal Sample_Sync1. For example, the first frame signal Frame #0 is generated and transmitted during a first cycle of the transmission reference signal Sample_Sync1, and the second frame signal Frame #1 is generated and transmitted during a second cycle of the transmission reference signal Sample_Sync1.

The reception-side digital interface circuit 210a of the BB sub-system sequentially receives the frame signals Frame #0 and Frame #1 synchronized with the transmission reference signal Sample_Sync1. However, the frame signals Frame #0 and Frame #1 are transmitted only for an interval corresponding to a portion of a single cycle of the transmission reference signal Sample_Sync1, rather than throughout the entire interval of the single cycle.

As a result, an idle interval during which no frame signal is transmitted occurs between respective frame signals Frame #0 and Frame #1. Therefore, the power manager 260 may switch the receiver 220 to active mode at the time at which each of the frame signals Frame #0 and Frame #1 is to be received, and may switch the receiver 220 to a power-down mode at the time at which transmission of the corresponding frame is completed. For example, the power manager 260 may control the normal reception of frame signals by causing the receiver 220 to enter power-down mode during an idle interval in which the transmission of the frame signal is completed based on the frame synchronization information FR_Info, and by waking up the receiver 220 before the time of reception of a subsequent frame signal.

Thus, receiver 220 may be powered down during the idle interval between the frame signal and the subsequent frame signal in order to reduce power consumption. Accordingly, as shown in FIG. 5, standby power in the wake-up period is lower than power in the active interval, and power consumption does not occur in the power-down interval, thus reducing the overall power consumption.

Figure 6:
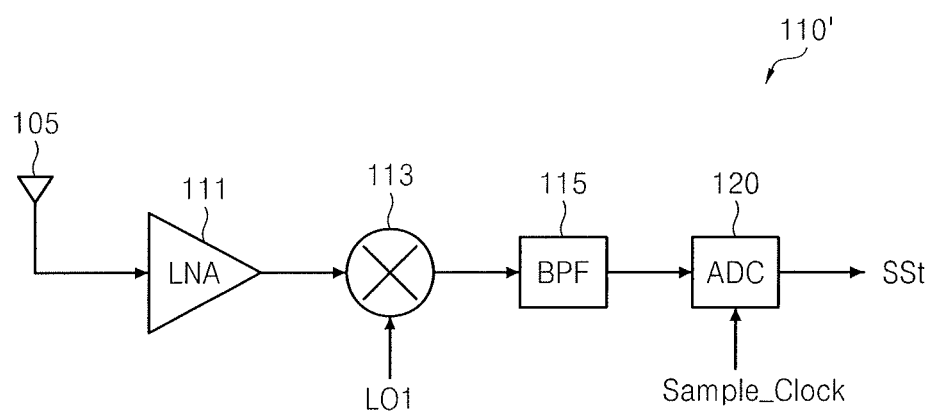
FIG. 6 illustrates an embodiment of an RF signal processing circuit.

FIG. 6 illustrates an embodiment of the RF signal processing circuit 110' in FIG. 2A. Referring to FIGS. 2A and 6, the RF signal processing circuit 110' may include an amplifier 111, a down-converter 113, a filter 115, and an A/D converter (ADC) 120. The amplifier 111 may be a low noise amplifier (LNA) for low-noise amplifying an RF signal. The down-converter 113 may convert the RF signal into a baseband (BB) signal by mixing the RF signal with an oscillation signal LO1 having a specific frequency. The filter 115 may be, but is not limited to, a band-pass filter for filtering an analog signal converted to the baseband signal. The A/D converter 120 may sample the analog signal based on a sampling clock Sample_Clock, quantize the sampled signal, and then output a sampled signal SSt, which is a digital signal.

Figure 7:
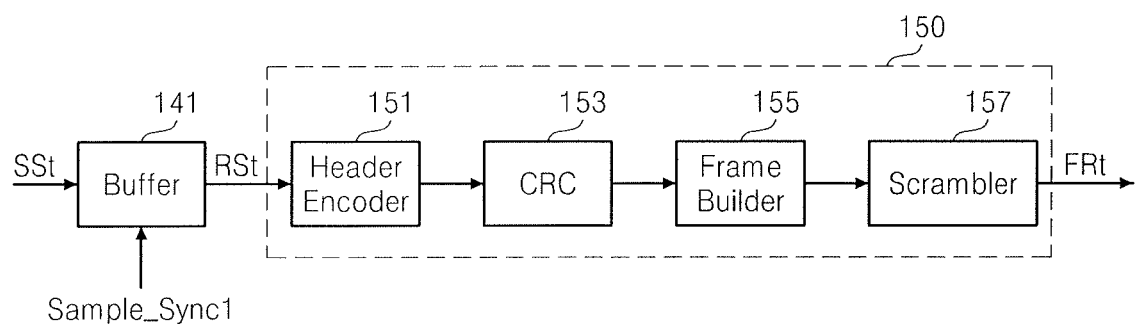
FIG. 7 illustrates an embodiment of a sample synchronization circuit and protocol builder.

FIG. 7 illustrates an embodiment of the sample synchronization circuit 140 and the protocol builder 150 in FIG. 2A. Referring to FIGS. 2A and 7, the sample synchronization circuit 140 may include a buffer 141 to receive and temporarily store a sampled signal SSt and to output the stored sampled signal SSt based on the transmission reference signal Sample_Sync1. The buffer 141 may be, for example, a FIFO buffer. The buffer 141 may output one or more stored sampled signals SSt whenever the transmission reference signal Sample_Sync1 is generated.

The protocol builder 150 may include a header encoder 151, a Cyclic Redundancy check (CRC) generator 153, a frame builder 155, and a scrambler 157. The header encoder 151 generates a frame header based on at least one sampled signal SSt. The frame header may include size (length) information of payload data in each frame signal. The CRC generator 153 may generate a CRC code based on the at least one sampled signal SSt. The frame builder 155 may build a frame signal including the frame header, the payload data, and the CRC code. The scrambler 157 may scramble the frame signal. According to some embodiments, one or more components (e.g., the CRC generator 153 and/or the scrambler 157) may be omitted.

Figure 8:
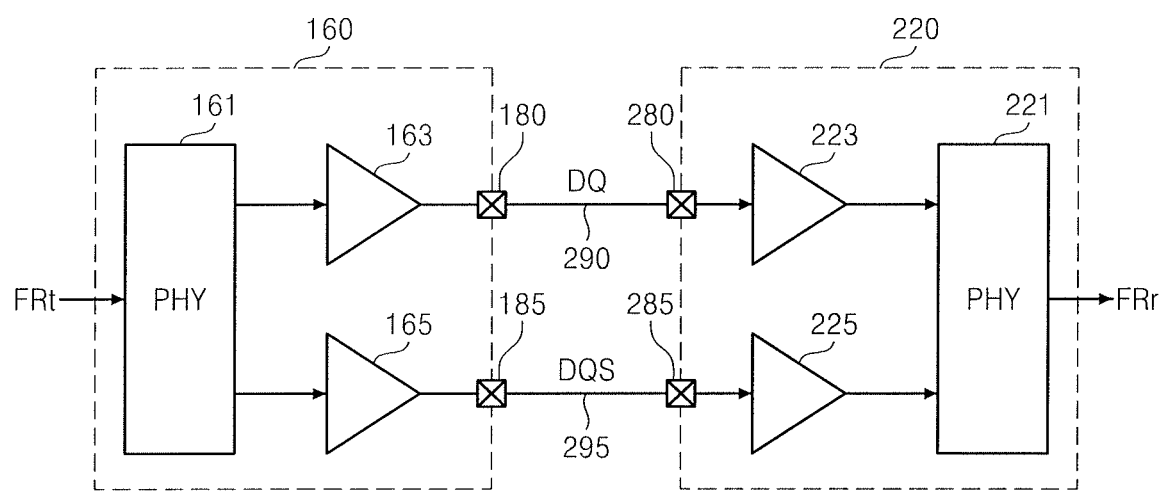
FIG. 8 illustrates an embodiment of a transmitter and a receiver.

FIG. 8 illustrates an embodiment of the transmitter 160 and the receiver 220 in FIG. 2A. Referring to FIGS. 2A and 8, the transmitter 160 may include a physical layer (PHY) circuit 161, a data transmitter 163, and a strobe transmitter 165. The PHY circuit 161 may convert a frame signal to a serial signal and may provide the serial signal to the data transmitter 163. Further, the PHY circuit 161 may generate a strobe signal DQS to be provided to the strobe transmitter 165.

The data transmitter 163 transmits a serial signal DQ to the receiver 220 through a data lane 290. The strobe transmitter 165 transmits the strobe signal DQS to the receiver 220 through a strobe signal lane 295.

The receiver 220 may include a PHY circuit 221, a data receiver 223, and a strobe receiver 225. The data receiver 223 receives the serial signal DQ through the data lane 290. The strobe receiver 221 receives the strobe signal DQS through the strobe signal lane 295.

The PHY circuit 221 may convert the serial signal into a parallel signal and may output the frame signal FRs.

In the embodiment of FIG. 8, the strobe signal DQS and the serial signal may be transmitted to the receiver 220. Accordingly, the strobe signal lane 295 and the data lane 290 may be between the RF sub-system 100 and the BB sub-system 200. In some embodiments, the strobe signal lane 295 may be omitted.

Figure 9:
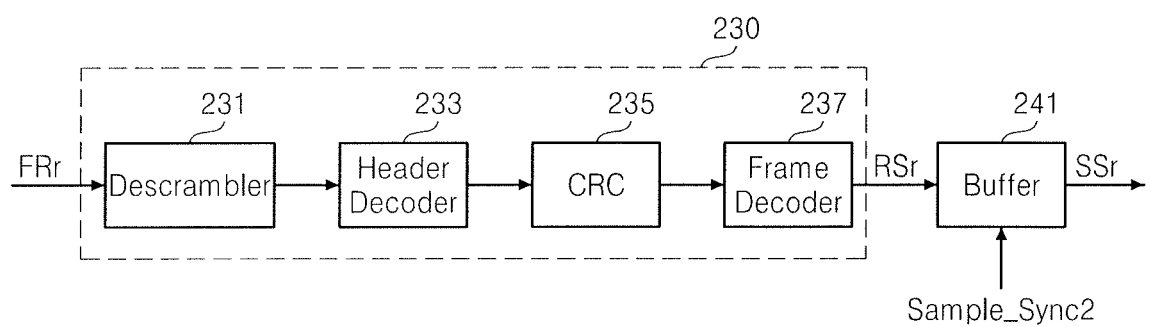
FIG. 9 illustrates an embodiment of a protocol parser.

FIG. 9 illustrates an embodiment of the protocol parser 230 in FIG. 2A. Referring to FIGS. 2A and 9, the protocol parser 230 includes a descrambler 231, a header decoder 233, a CRC circuit 235, and a frame decoder 237. The protocol parser 230 may perform the reverse of the procedure performed by the protocol builder 150 in FIG. 7. The descrambler 231 descrambles a frame signal. The header decoder 233 may obtain frame information (e.g., length of payload data) by decoding the header of the descrambled frame signal.

The CRC circuit 235 detects whether an error has occurred by checking the CRC code of the frame signal.

The frame decoder 237 reconstructs at least one sampled signal RSr that is the payload data by decoding the frame signal. The reconstructed sampled signal RSr may be stored in a buffer 241.

The buffer 241 may receive and temporarily store the reconstructed sampled signal RSr and output the stored sampled signal RSr based on the reception reference signal Sample_Sync2. The buffer 241 may be, for example, a FIFO buffer. The buffer 241 may transfer one or more stored sampled signals SSr to the modem 270 whenever each reception reference signal Sample_Sync2 is generated.

Figure 10:
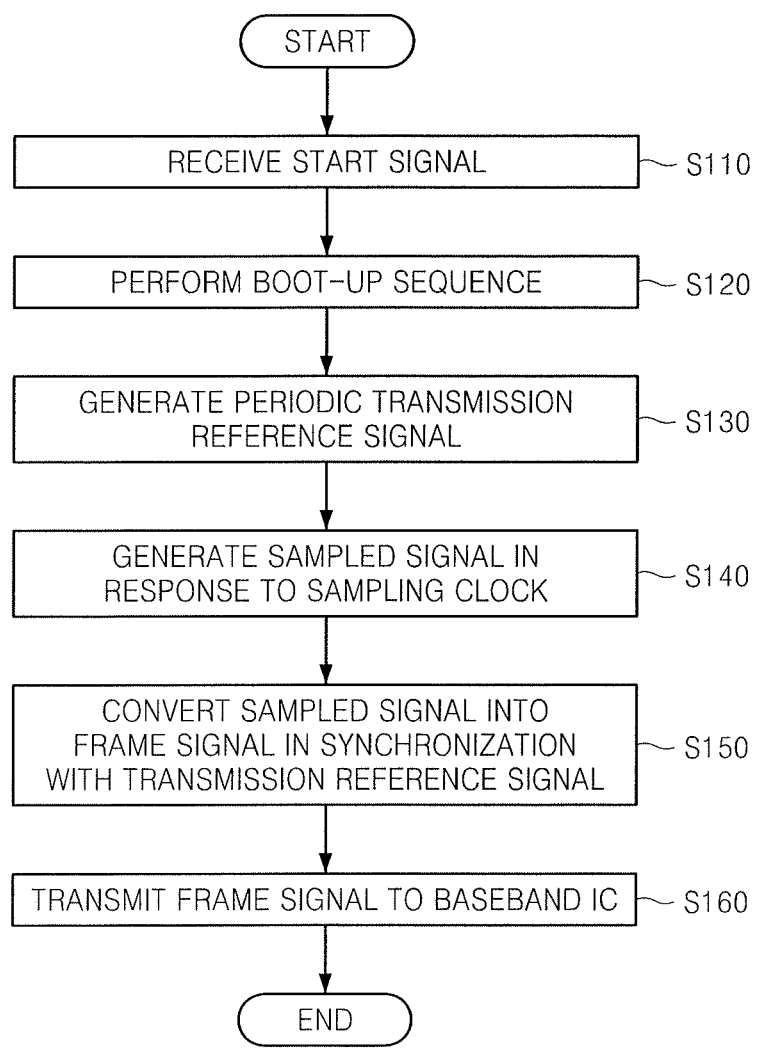
FIG. 10 illustrates operation of an RF sub-system according to another embodiment.

FIG. 10 illustrates an embodiment of a method for operating the RF sub-system. The operating method may be performed by the RF sub-system 100, 100a, or 100b in FIG. 1, 2A, or 2B.

Referring to FIG. 10, the RF sub-system 100, 100a or 100b may receive a start signal from a BB sub-system 200 or a master synchronization circuit (20 in FIG. 2B) in operation S110. The RF sub-system 100, 100a, or 100b may wake up based on the start signal and perform a boot-up sequence in operation S120. The boot-up sequence may include setting of parameters for operation of the RF sub-system 100, 100a, or 100b, in operation S120.

When the boot-up sequence is completed, the RF sub-system 100, 100a, or 100b generates a transmission reference signal Sample_Sync1 having a predetermined period in operation S130.

The RF sub-system 100, 100a, or 100b receives the RF signal through an antenna, processes the RF signal, and then generates at least one sampled signal by converting an analog signal to a digital signal based on a sampling clock in operation S140. The RF sub-system 100, 100a, or 100b converts the at least one sampled signal to a frame signal in synchronization with the transmission reference signal in operation S150. The RF sub-system 100, 100a, or 100b transmits the frame signal to the BB sub-system according to a digital interface protocol in operation S160.

According to some embodiments, one or more of the operations in FIG. 10 may be omitted, the sequence of the operations may be changed, and/or two or more of the operations may be performed in parallel.

Figure 11:
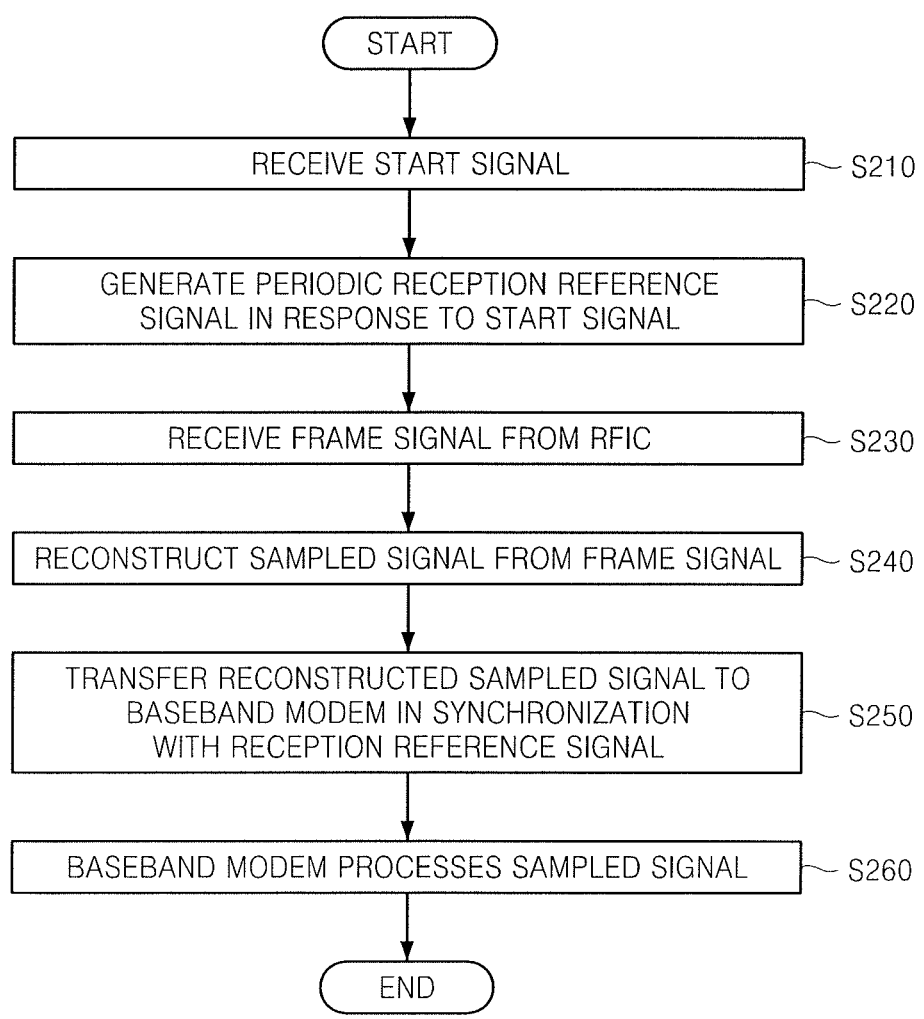
FIG. 11 illustrates operation of a BB sub-system according to another embodiment.

FIG. 11 illustrates an embodiment of a method for operating the BB sub-system. The operating method of FIG. 11 may be performed by the BB sub-system 200, 200a, or 200b in FIG. 1, 2A or 2B.

Referring to FIG. 11, the BB sub-system 200, 200a, or 200b may receive a start signal from a master synchronization circuit (20 in FIG. 2B) in operation S210. According to some embodiments, the start signal may be internally generated in the BB sub-system 200, 200*a*, or 200*b*. The BB sub-system 200, 200*a*, or 200*b* generates a reception reference signal Sample_Sync2 having the same period as the transmission reference signal Sample_Sync1 based on the start signal in operation S220.

Furthermore, the BB sub-system 200, 200*a*, or 200*b* receives a frame signal from the RF sub-system 100, 100*a*, or 100*b* in operation S230, and reconstructs the at least one sampled signal from the frame signal in operation S240. The BB sub-system 200, 200*a*, or 200*b* transfers the reconstructed sampled signal to the baseband modem in synchronization with the reception reference signal in operation S250, and the baseband modem processes the sampled signal in operation S260.

According to some embodiments, one or more of the operations in FIG. 11 may be omitted, the sequence of the operations may be changed, and/or two or more of the operations may be performed in parallel.

Figure 12:
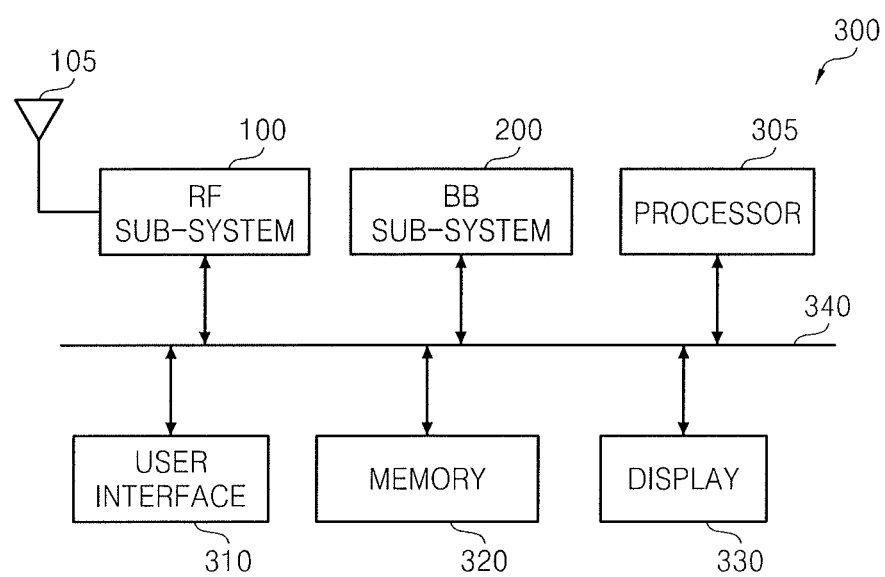
FIG. 12 illustrates another embodiment of a wireless communication device.

FIG. 12 illustrates an embodiment of a wireless communication device 300 which may include the RF sub-system 100 and the BB sub-system 200, a processor 305, a memory 320, a bus 340, and one or more antennas 105. The wireless communication device 300 may further include a user interface 310 and a display device 330. The processor 305 controls the overall operation of the wireless communication device 300. The RF sub-system 100 and the BB sub-system 200 have been described above.

The memory 320 stores various types of data and information in the wireless communication device 300. The memory 320 may store programs for processing and control by the processor 305, and may temporarily store information that is input/output through the user interface 310. Further, the memory 320 may store data received or to be transmitted by the RF sub-system 100 and data that is to be displayed through the display device 330.

The processor 305 may be functionally connected to components such as the RF sub-system 100, the BB sub-system 200 and the memory 320 to control the components. The processor 305 may be, for example, a multi-core processor. In one embodiment, the multi-core processor may be a single computing component having two or more independent, substantial processors (e.g., cores), each of which may read and execute program instructions.

According to some embodiments, the processor 305 may include a processor for exclusively controlling the RF sub-system 100 and/or the BB sub-system 200, in additional to the processor for controlling overall operation of the wireless communication device 300. The processor 305 may be, for example, a controller, a microcontroller, a microprocessor, a microcomputer, an application processor, or the like. The processor 305 may be implemented as hardware, firmware, or software, or a combination thereof.

The user interface 310 may be a device for allowing the user of the wireless communication device 300 to interface with the wireless communication device 300. For example, the user interface 310 may include various types of input devices, e.g., a button, a keypad, a dial, a touch screen, an audio input interface, an image/video input interface, or a sensor data input interface. The display device 330 may display image/video signals to the user under the control of the processor 305.

Figure 13:
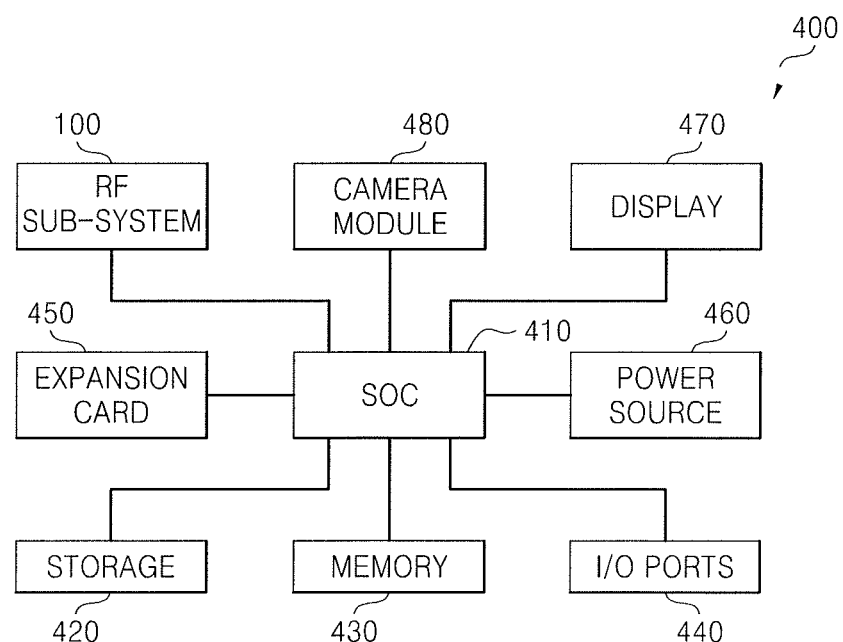
FIG. 13 illustrates another embodiment of a wireless communication device.

FIG. 13 illustrates an embodiment of a wireless communication device 400 which, for example, may be a portable device. The portable device may be, for example, user equipment, a mobile phone, a smart phone, a tablet PC, a personal digital assistant (PDA), a personal navigation device or a portable navigation device (PDN), or an Internet of things (IoT) device.

The wireless communication device 400 includes a RF sub-system 100, a SoC 410, a power source 460, a storage device 420, a memory 430, input/output (I/O) ports 440, an expansion card 450 and a display 470. In one embodiment, the wireless communication device 400 may include a camera module 480. The RF subsystem 100 may correspond to an RF subsystem 100, 100*a* or 100*b* in FIGS. 1, 2*a*, or FIG. 2*b*.

The SoC 410 may control an operation of at least one of elements 100, 420 to 480. The SOC 410 may include the BB subsystem 200 and a processor according to some embodiments. For example, the processor and the BB subsystem 200 may be implemented as the SOC 410. The processor in the SOC 410 may be, for example, a controller, a microcontroller, a microprocessor, a microcomputer, an application processor, or the like. The processor may be implemented as hardware, firmware, or software, or a combination thereof.

The storage device 420 may be a hard disk drive or a solid state drive (SSD).

The memory 430 may be a volatile memory or a non-volatile memory.

The I/O ports 440 may receive data transmitted to the wireless communication device 400 or transmit data output from the wireless communication device 400 to an external device. For example, the I/O ports 440 may include a port to connect a pointing device such as a computer mouse to the wireless communication device 400, a port to connect a printer to the wireless communication device 400, a port to connect a universal serial bus (USB) drive to the wireless communication device 400, etc.

The expansion card 450 may be a secure digital (SD) card or a multimedia card (MMC). In one embodiment, the expansion card 450 may be a subscriber identification nodule (SIM) card or a universal subscriber identity module (USIM) card.

The power source 460 may supply an operating voltage to at least one among these elements 100, and 410 to 480.

The display 470 may display data output from the storage device 420, the memory 430, the I/O ports 440, or the expansion card 450.

The camera module 480 may convert an optical image into an electrical image. The electrical image output from the camera module 480 may be stored in the storage device 420, the memory 430, or the expansion card 450. Also, the electrical image output from the camera module 480 may be displayed on the display 470.

Figure 14:
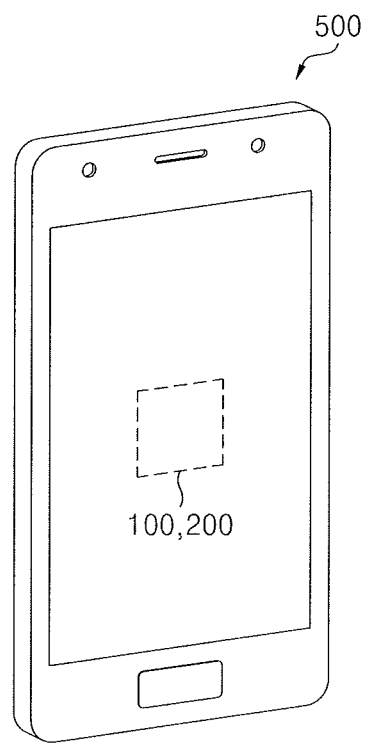
FIG. 14 illustrates another embodiment of a wireless communication device.

FIG. 14 illustrates another embodiment of a wireless communication device 500 which may include the RF sub-system 100 and the BB sub-system 200 of FIG. 1. The wireless communication device 500 may be, for example, a portable device, e.g., user equipment, a mobile phone, a smart phone, a tablet PC, a personal digital assistant (PDA), an enterprise digital assistant (EDA), an Internet of things (IoT) device, a mobile internet device (MID), or the like.

The methods, processes, and/or operations herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The processors, encoders, filters, scramblers, error correctors, receivers, modems, protocol builders, interfaces, managers, synchronizers, and other processing features of the embodiments described herein may be implemented in logic which, for example, may include hardware, software, or both. When implemented at least partially in hardware, the processors, encoders, filters, scramblers, error correctors, receivers, modems, protocol builders, interfaces, managers, synchronizers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, encoders, filters, scramblers, error correctors, receivers, modems, protocol builders, interfaces, managers, synchronizers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

According to some embodiments, constant latency may be obtained when a digital interface is between the RF chip and the BB chip of the wireless communication device. Accordingly, deterioration of performance that may occur due to an additional task for synchronization between RF and BB chips may be prevented.

According to some embodiments, the wireless communication device is operated at low power to reduce power consumption.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A baseband integrated circuit (IC) for performing digital communication with a radio frequency integrated circuit (RFIC), comprising:
   a digital interface to receive a frame signal including at least one sampled signal from the RFIC based on a digital interface protocol and to synchronously receive a transmission reference signal, reconstruct the at least one sampled signal from the frame signal, and transfer the reconstructed sampled signal to a baseband modem in synchronization with a reception reference signal based on a constant phase difference between the reception reference signal and the transmission reference signal;
   a sample synchronization manager to generate the reception reference signal and frame synchronization information based on the reception reference signal, wherein the baseband IC is to receive the frame signal from the RFIC in synchronization with the transmission reference signal, wherein the reception reference signal has a period identical to a period of the transmission reference signal and has the constant phase difference with respect to the transmission reference signal, the constant phase difference being set in accordance with a maximum logic latency on a transmission path between the baseband IC and the RFIC;
   wherein the digital interface includes: a receiver to receive the frame signal converted to a serial signal through a data lane connected to the RFIC, convert the frame signal into a parallel signal, and output the frame signal as the parallel signal; and
   a power manager to power down the receiver, during an idle interval after completion of reception of a single frame signal by the receiver, based on the frame synchronization information.

2. The baseband IC as claimed in claim 1, wherein a sample latency between a time at which the sampled signal is synchronized with the transmission reference signal and a time at which the received sampled signal is synchronized with the reception reference signal is constant.

3. The baseband IC as claimed in claim 2, wherein the sample latency corresponds to a sum of the constant phase difference and a single period of the transmission reference signal.

4. The baseband IC as claimed in claim 1, wherein the digital interface includes:
   a protocol parser to reconstruct the sampled signal by decoding the frame signal, output from the receiver; and
   a sample synchronizer to transfer the reconstructed sampled signal to the baseband modem in synchronization with the reception reference signal.

5. The baseband IC as claimed in claim 1, wherein the power manager is to wake up the receiver at a time at which a subsequent frame signal is to be received or a time at which the subsequent frame signal is predicted to be received.

6. The baseband IC as claimed in claim 4, wherein the digital interface includes a buffer to store the reconstructed sampled signal and output the stored sampled signal based on the reception reference signal.

7. The baseband IC as claimed in claim 4, wherein the protocol parser includes:
   a descrambler to descramble the frame signal;
   a header decoder to decode a header of the descrambled frame signal;
   a Cyclic Redundancy Check (CRC) circuit to check a CRC code of the frame signal; and
   a frame decoder to reconstruct the sampled signal by decoding the frame signal.

8. The baseband IC as claimed in claim 1, wherein the sample synchronization manager is to generate the transmission reference signal and transmit the transmission reference signal to the RFIC.

9. The baseband IC as claimed in claim 8, wherein the transmission reference signal is transmitted to the RFIC through a separate pin.

10. The baseband IC as claimed in claim 1, wherein:
the sample synchronization manager is to generate the reception reference signal based on a start signal output from a master synchronization circuit at predetermined periods, and
the transmission reference signal is generated by the RFIC based on the start signal.

11. A wireless communication device, comprising:
a radio frequency integrated circuit (RFIC); and
a baseband IC to perform digital communication with the RFIC,
wherein the baseband IC includes:
a digital interface to receive a frame signal including at least one sampled signal from the RFIC according to a digital interface protocol and to synchronously receive a transmission reference signal, reconstruct the at least one sampled signal from the frame signal, and transfer the reconstructed sampled signal to a baseband modem in synchronization with a reception reference signal based on a constant phase difference between the reception reference signal and the transmission reference signal;
a sample synchronization manager to generate the reception reference signal and frame synchronization information based on the reception reference signal, wherein the frame signal is to be transmitted from the RFIC to the baseband IC in synchronization with the transmission reference signal, wherein the reception reference signal has a period identical to a period of the transmission reference signal and has the constant phase difference with respect to the transmission reference signal, the constant phase difference being set in accordance with a maximum logic latency on a transmission path between the baseband IC and the RFIC;
wherein the digital interface includes: a receiver to receive the frame signal converted to a serial signal through a data lane connected to the RFIC, convert the frame signal into a parallel signal, and output the frame signal as the parallel signal; and
a power manager to power down the receiver, during an idle interval after completion of reception of a single frame signal by the receiver, based on the frame synchronization information.

12. The wireless communication device as claimed in claim 11, wherein a sampling latency between a time at which the sampled signal is synchronized with the transmission reference signal and a time at which the received sampled signal is synchronized with the reception reference signal is constant.

13. The wireless communication device as claimed in claim 11, wherein the digital interface includes:
a protocol parser to reconstruct the sampled signal by decoding the frame signal, output from the receiver; and
a sample synchronizer to transfer the reconstructed sampled signal to the baseband modem in synchronization with the reception reference signal.

14. A baseband integrated circuit (IC) for performing digital communication with a radio frequency integrated circuit (RFIC), comprising:
first logic to reconstruct a frame signal having at least two sampled signals generated using a sampling period and to output the reconstructed at least two sampled signals to a baseband modem in synchronization with a reception reference signal; and
second logic to generate the reception reference signal and frame synchronization information based on the reception reference signal,
wherein the first logic is to receive the frame signal from the RFIC in synchronization with a transmission reference signal, the transmission reference signal and the reception reference signal both having a period greater than the sampling period, the transmission reference signal and the reception reference signal having a constant phase difference therebetween, the constant phase difference being set in accordance with a maximum logic latency on a transmission path between the baseband IC and the RFIC, and the at least two sampled signals being synchronously transmitted, wherein the first logic includes:
a receiver to receive the frame signal converted to a serial signal through a data lane connected to the RFIC, convert the frame signal into a parallel signal, and output the frame signal as the parallel signal; and
a power manager to power down the receiver, during an idle interval after completion of reception of a single frame signal by the receiver, based on the frame synchronization information.

15. The baseband IC as claimed in claim 14, wherein:
a latency is constant between a first time and a second time,
the first time corresponds to when the at least one sampled signal is synchronized with the transmission reference signal, and
the second time corresponds to when the at least one sampled signal is synchronized with the reception reference signal.

* * * * *